United States Patent
Gupta et al.

(10) Patent No.: US 9,354,066 B1
(45) Date of Patent: May 31, 2016

(54) COMPUTER VISION NAVIGATION

(71) Applicant: Wal-Mart Stores, Inc., Bentonville, AR (US)

(72) Inventors: Ankit Gupta, Bangalore (IN); Saurav Shah, Bangalore (IN); Venkata Pranay Kumar Sowdaboina, Bangalore (IN)

(73) Assignee: WAL-MART STORES, INC., Bentonville, AK (US)

( * ) Notice: Subject to any disclaimer, the term of this patent is extended or adjusted under 35 U.S.C. 154(b) by 0 days.

(21) Appl. No.: 14/553,510

(22) Filed: Nov. 25, 2014

(51) Int. Cl.
G01C 21/00 (2006.01)
G01C 21/20 (2006.01)

(52) U.S. Cl.
CPC .................... *G01C 21/206* (2013.01)

(58) Field of Classification Search
CPC ...................................... G01C 21/206
See application file for complete search history.

(56) References Cited

U.S. PATENT DOCUMENTS

| | | | | |
|---|---|---|---|---|
| 6,442,530 B1* | 8/2002 | Miller | ................. | G06Q 10/087 705/16 |
| 7,780,081 B1* | 8/2010 | Liang | ................. | G06Q 10/087 235/383 |
| 2002/0158133 A1* | 10/2002 | Conzola | ................. | G06Q 30/06 235/462.45 |
| 2002/0178072 A1* | 11/2002 | Gusler | ................. | G06Q 10/10 705/26.1 |
| 2005/0125386 A1* | 6/2005 | Diebold | ................. | G06Q 30/06 |
| 2005/0177463 A1* | 8/2005 | Crutchfield | ............. | G06Q 30/06 705/26.9 |
| 2006/0226099 A1* | 10/2006 | Reid | ................... | B65G 1/1373 211/113 |
| 2006/0289635 A1* | 12/2006 | Lin | ........................ | G06Q 30/06 235/383 |
| 2008/0017708 A1* | 1/2008 | Singer-Harter | ........ | G06Q 30/02 235/383 |
| 2008/0237339 A1* | 10/2008 | Stawar | ................. | B62B 3/1408 235/383 |
| 2008/0238615 A1* | 10/2008 | Carpenter | ............. | B62B 3/1424 340/5.91 |
| 2009/0012704 A1* | 1/2009 | Franco | ................... | G01C 21/20 701/532 |
| 2009/0182499 A1* | 7/2009 | Bravo | .................... | G01C 21/20 701/408 |
| 2010/0086192 A1* | 4/2010 | Grigsby | ............ | G06F 17/30256 382/141 |
| 2010/0262554 A1* | 10/2010 | Elliott | .................... | G01C 21/20 705/323 |
| 2011/0178862 A1* | 7/2011 | Daigle | ............... | G06Q 30/0226 705/14.27 |
| 2011/0264520 A1* | 10/2011 | Puhakka | ............. | G01C 21/206 705/14.49 |
| 2011/0276385 A1* | 11/2011 | Keller | ................. | G06Q 20/202 705/14.38 |

(Continued)

*Primary Examiner* — Calvin Cheung
(74) *Attorney, Agent, or Firm* — Howard & Howard Attorneys PLLC

(57) ABSTRACT

A system for computer-aided visual recognition of products may help a customer navigate to a selected product in a retail store. A customer can direct a mobile computing device camera at one or more targeted products displayed on store shelves. Image recognition operations can be carried out to compare the targeted product image(s) against images from a prepopulated product image store of known products. Upon a positive match, shelf location information of the identified targeted product(s) may be used to determine the current location of the customer. An in-store destination location is defined by the shelf location for the selected product. A route may be calculated to navigate the customer from the current location to the destination location.

20 Claims, 5 Drawing Sheets

(56) References Cited

U.S. PATENT DOCUMENTS

| | | | |
|---|---|---|---|
| 2012/0190386 A1* | 7/2012 | Anderson | G01C 15/04 455/456.3 |
| 2012/0259732 A1* | 10/2012 | Sasankan | G01S 5/0205 705/26.9 |
| 2013/0036043 A1* | 2/2013 | Faith | G06Q 30/06 705/39 |
| 2013/0173435 A1* | 7/2013 | Cozad, Jr. | G06Q 10/087 705/28 |
| 2013/0218721 A1* | 8/2013 | Borhan | G06Q 30/0207 705/26.41 |
| 2014/0003727 A1* | 1/2014 | Lortz | G06Q 10/087 382/218 |
| 2014/0006229 A1* | 1/2014 | Birch | G06Q 10/087 705/28 |
| 2014/0019200 A1* | 1/2014 | Argue | G06Q 30/02 705/7.29 |
| 2014/0039951 A1* | 2/2014 | Appel | G06Q 30/02 705/7.11 |
| 2014/0129378 A1* | 5/2014 | Richardson | G06Q 30/0639 705/26.8 |
| 2014/0156461 A1* | 6/2014 | Lerner | G06Q 30/0635 705/26.61 |
| 2014/0172640 A1* | 6/2014 | Argue | G06Q 30/0641 705/26.61 |
| 2014/0201026 A1* | 7/2014 | Adoni | G06Q 30/0631 705/26.7 |
| 2014/0207614 A1* | 7/2014 | Ramaswamy | G06Q 30/0613 705/26.41 |
| 2014/0207615 A1* | 7/2014 | Li | G06Q 30/0623 705/26.61 |
| 2014/0214547 A1* | 7/2014 | Signorelli | G06Q 30/0267 705/14.64 |
| 2014/0214600 A1* | 7/2014 | Argue | G06Q 30/0639 705/26.8 |
| 2014/0258050 A1* | 9/2014 | Abboud | G06Q 10/087 705/28 |
| 2014/0279241 A1* | 9/2014 | Bartholomew | G06Q 30/0623 705/26.61 |
| 2014/0285660 A1* | 9/2014 | Jamtgaard | G01S 3/7864 348/143 |
| 2014/0324615 A1* | 10/2014 | Kulkarni | G06Q 30/0601 705/26.1 |
| 2014/0365333 A1* | 12/2014 | Hurewitz | G06Q 30/0643 705/26.9 |
| 2015/0039422 A1* | 2/2015 | Abraham | G06Q 30/0251 705/14.49 |
| 2015/0092061 A1* | 4/2015 | Chao | G06Q 30/00 348/158 |
| 2015/0169597 A1* | 6/2015 | Edge | G06F 17/3087 707/751 |
| 2015/0170256 A1* | 6/2015 | Pettyjohn | G06Q 30/0639 705/14.49 |

* cited by examiner

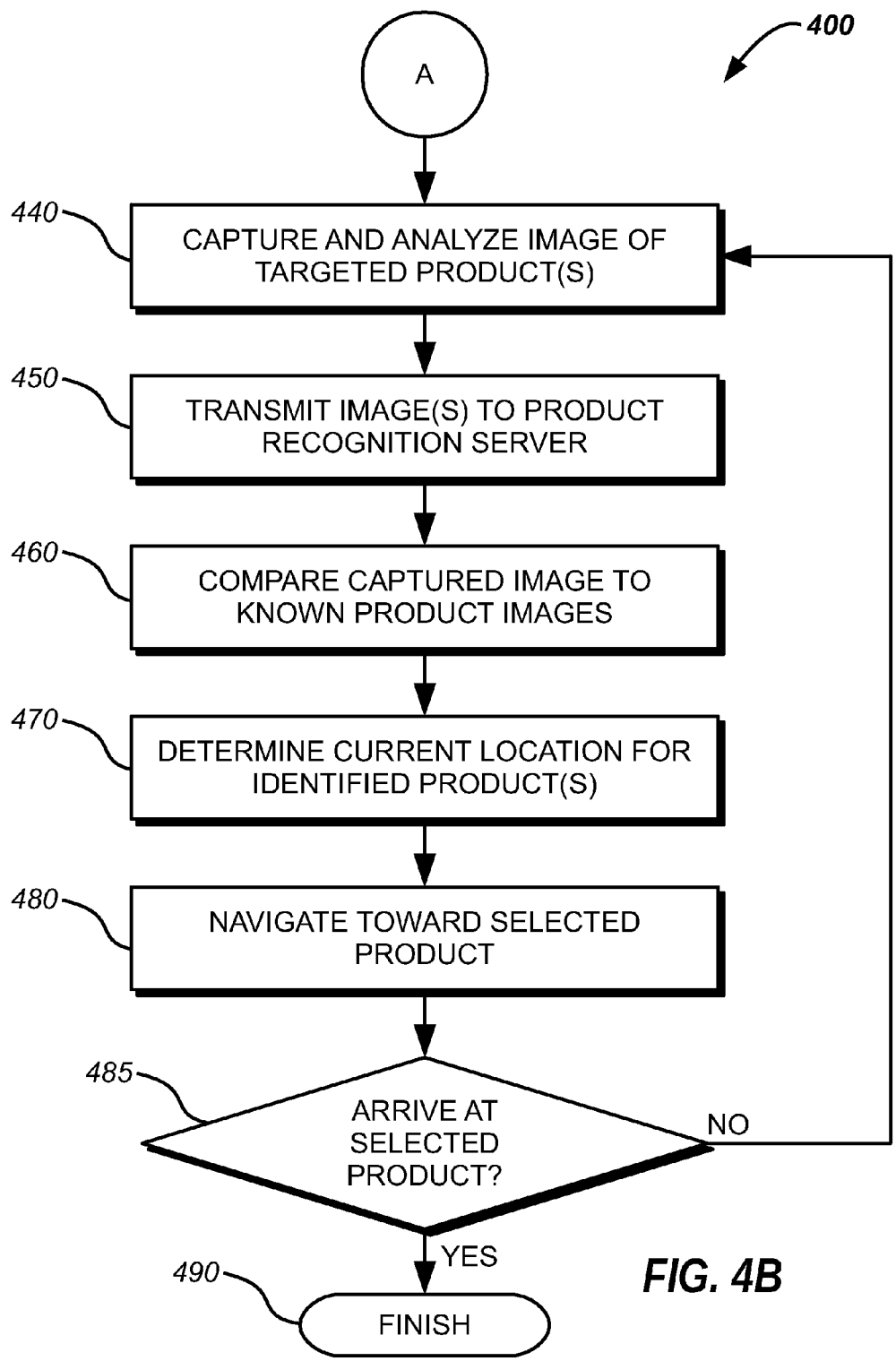

COMPUTER VISION NAVIGATION

BACKGROUND

In recent years, mobile computing devices have become ubiquitous around the world in many societies. Worldwide, hundreds of millions of mobile computing devices are sold every year. Such devices may be used frequently throughout each day, and thus may be carried by users at nearly all times. Such mobile computing devices include, but are not limited to: smartphones, tablets, e-readers, wearable computing devices such as smart glasses and smartwatches, and other types of mobile electronic computing devices.

One common use of mobile computing devices is navigation. Mobile devices can determine the current location of the user through the satellite-based Global Positioning System (GPS), cellular tower networks, other active or passive networks, and combinations thereof, and then guide the user to a desired destination using by recalling relevant maps, calculating the most efficient routes, and providing turn-by-turn directions to the destination.

Indoor navigation can be provided in several ways. One current implementation is carried out by installing beacons in and around buildings, where the location of each beacon is known and each beacon emits a unique identifier. Some indoor navigation systems work on principles similar to GPS, while others operate by detecting the respective signal strengths of multiple beacons with the presumption that greater distance from the beacon equates to a weaker beacon signal. Another implementation of indoor navigation uses dead reckoning and relies on the internal sensors of the mobile computing device, such as the accelerometers and compass.

However, current navigation systems exhibit some drawbacks. For example, GPS signals may become significantly weaker and essentially useless as a user enters into a building or other covered space. Indoor navigation can be costly and expensive to set up and maintain, and may be error prone and/or lack accuracy to a degree that is unacceptable to many users.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 4B is a second part of a flow chart illustration of a method of navigating to selected product according to one embodiment of the present disclosure.

Figure 1:
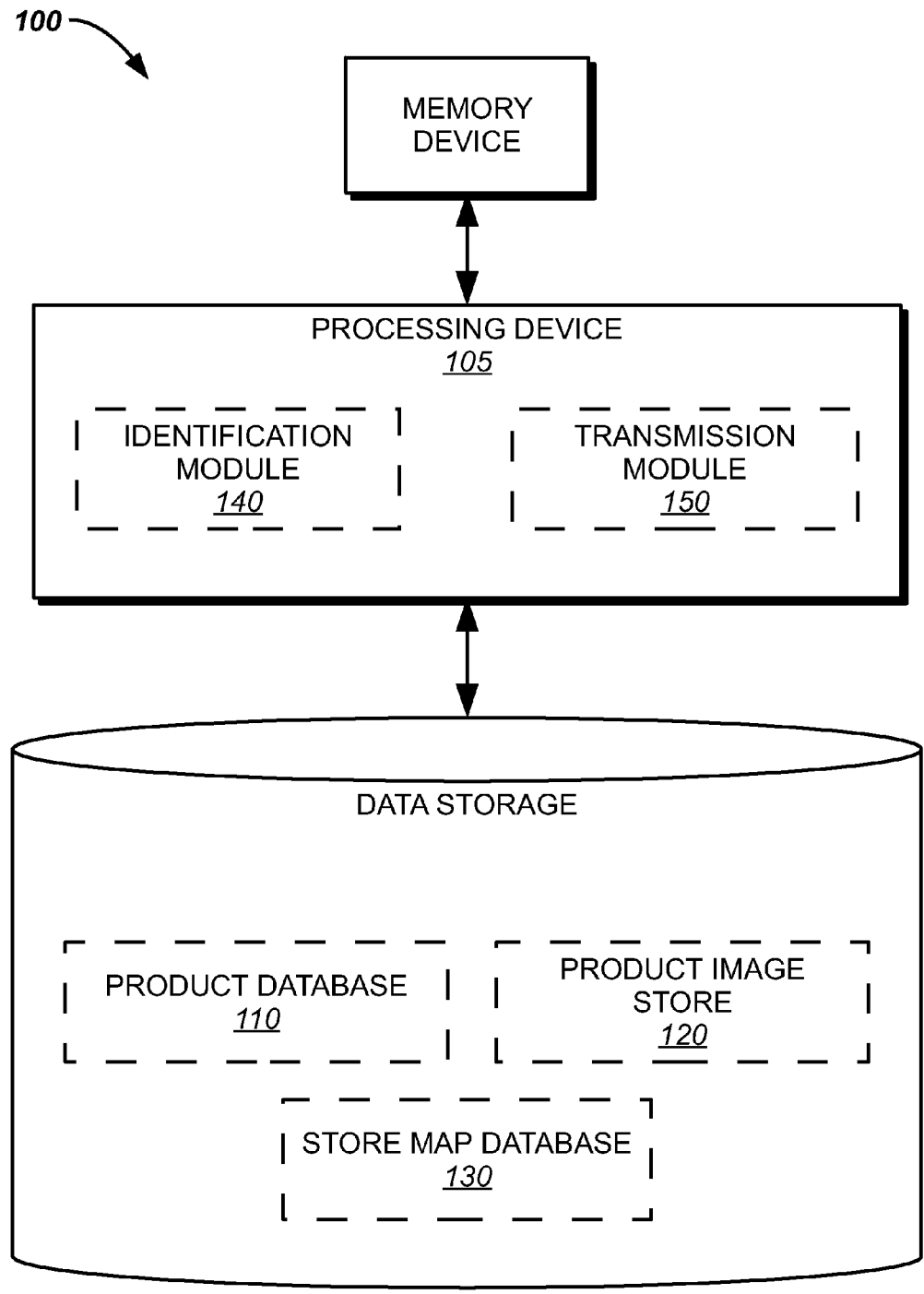
FIG. 1 is a block diagram illustrating a navigation server according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for locating and positioning through computer image recognition. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, locating and positioning software on a mobile device may provide navigation and turn-by-turn directions to customers or potential customers. In particular, customers may receive navigation directions to a retailer's store location and then directions to the location of a selected product within the store. In one embodiment, locating and position is accomplished by traditional GPS, cellular networks, and/or combinations thereof while the customer is outside but upon entrance by the customer into the store, the mobile computing device may transition into an "in-store" mode. According to various embodiments of the present disclosure, the in-store mode relies upon image recognition to locate the current position of the mobile computing device. In particular, one embodiment of the present disclosure is directed to computer-implemented image recognition of retail products on shelves, displays, or the like within a retail store to determine a current location.

According to embodiments, image recognition of a retail product may be carried out when products, or packaging thereof, are in a field of view of a mobile computing device camera. Such products may be identified using computer image recognition techniques. In various embodiments, a map of locations of the products within the retail store may be recalled and consulted to determine a current location based on product images captured by the mobile computing device. Upon determining a current location within the store, and given a desired destination within the store, directions may be provided to the customer to walk to the destination.

FIG. 1 is a block diagram depicting a navigation server 100 according to one embodiment of the present disclosure. In the illustrated embodiment, navigation server 100 includes a product database 110, product image store 120, and store map database 130. In an embodiment, navigation server 100 includes a processing device 105 and computer-readable instructions configured to include an identification module 140 and a transmission module 150.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

According to an embodiment, product database 110 includes memory containing the identities of various products. Such products may include products offered for sale in a retail store associated with navigation server 100.

According to an embodiment, product image store 120 includes memory containing numerous prepopulated images of the products. In one example embodiment, product image store 120 includes at least four or five images for each product. In other embodiments, other quantities of images for each product are stored at product image store 120. Such images may include images showing multiple perspectives of each product and/or product packaging. For example, a product may have multiple images stored at product image store 120, each image respectively depicting the front, back, sides, top, and bottom of the product or packaging. In one embodiment, product image store 120 includes an association between each product image and the corresponding product in product database 110. In an embodiment, product image store 120 may be continually supplemented with new images of the products.

In an embodiment, store map database 130 includes memory containing data related to the physical location of each product within the retail store. In particular embodiments, store map database 130 stores physical coordinates of each product. In one embodiment, such physical coordinates include a vertical coordinate, which may correspond to a shelf height where each product is displayed. In embodiments, store map database 130 includes memory containing an aisle number, a bay number, a display number, a shelf number, combinations of the foregoing, or other indicia of in-store locations for each product. In an embodiment, store map database 130 is adapted to be queried with a retail product and return the physical location of the product within the store.

In one embodiment, processing device 105 is adapted to communicate with product database 110 and product image store 120 and receive one or more signals from a mobile computing device used by a customer. Embodiments of processing device 105 include a memory device storing computer readable instructions and one or more processors adapted to execute the computer readable instructions.

According to embodiments, identification module 140 is operable to receive one or more signals from a mobile computing device operated by a customer. Such signals generated by the mobile computing device may include a product image captured by a camera on the mobile computing device. In one embodiment, an image is received at the identification module 140 and compared to images in product image store 120 to find a match between the images. When a match has been found and the product(s) identified, data related to the identified product(s) can be recalled from store map database 130 to determine the in-store location of the identified product(s).

Identification module 140 can direct the transmission module 150 to transmit all or some of the information gathered about the identified product to the mobile computing device for display to the consumer. In an embodiment, transmission module 150 can additionally transmit instructions to the mobile computing device to present navigation directions for the customer to walk to a selected location within the store.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
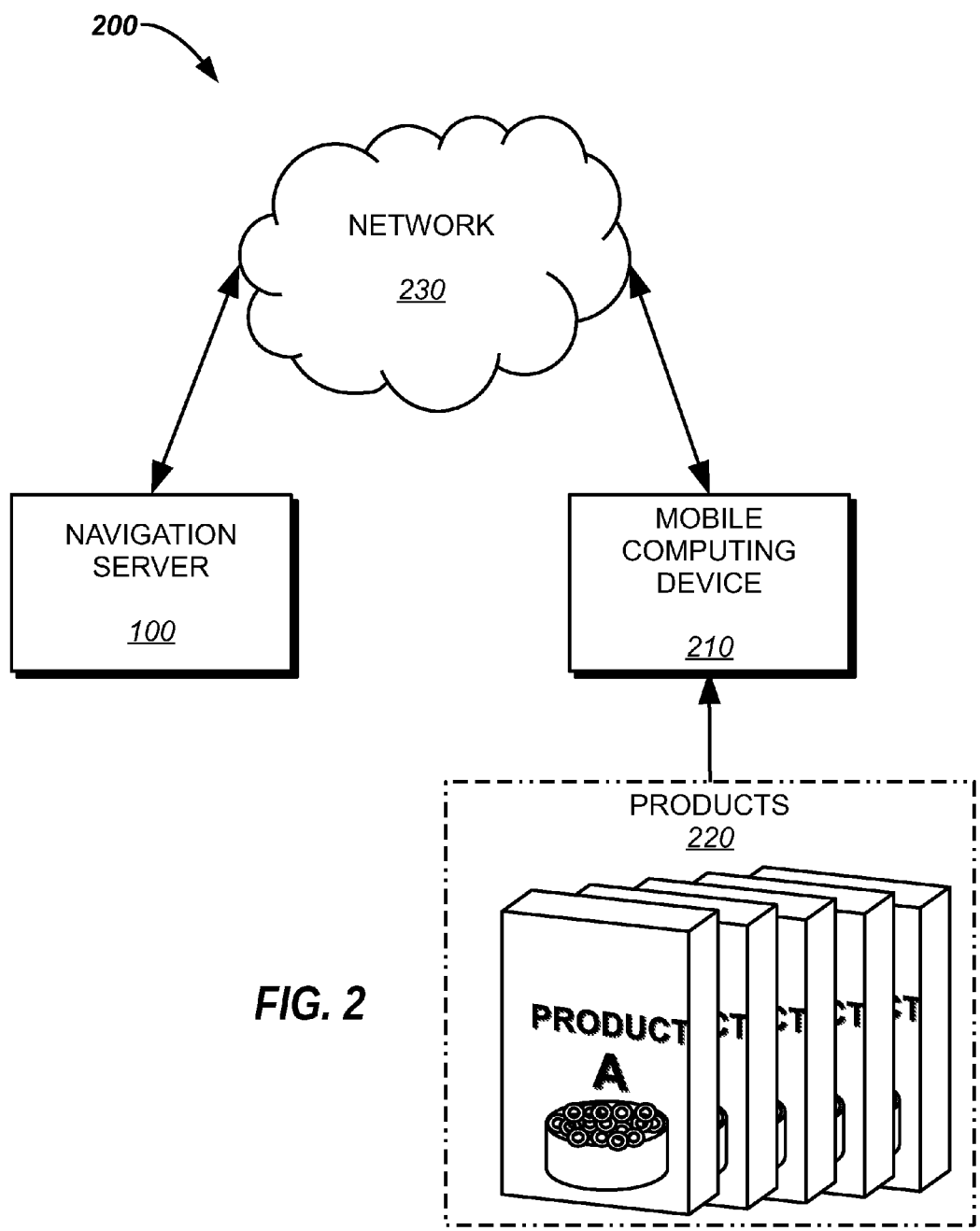
FIG. 2 is a schematic illustrating a navigation system according to embodiments of the present disclosure.

FIG. 2 is an example schematic illustrating a navigation system 200 according to embodiments of the present disclosure. Navigation system 200 can carry out a computer-implemented method that includes identifying one or more products depicted in images captured by a customer, determine the current location where said images were captured, and provide directions for the customer to walk from the current location to a selected destination.

In an embodiment, a mobile computing device 210 can be possessed and used by a customer to capture an image of one or more targeted products 220. In various embodiments, mobile computing device 210 comprises a smartphone, a tablet, an e-reader, a wearable computing device such as smart glasses or smartwatches, or any other mobile computing device operable to receive and/or transmit data, or any other electronic computing device operable to receive and/or transmit data, such as video data, audio data, and other forms of data.

The signals transmitted from mobile computing device 210 and received by navigation server 100 can be transmitted through a network 230. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

In response to the signals received from mobile computing device 210, navigation server 100 can identify one or more targeted products 220 that are depicted in the image captured by the mobile computing device 210 by applying various computer image recognition techniques and comparing the image of targeted products 220 to product images at product image store 120.

After identifying one or more products, navigation server 100 can recall information associated with the product. This information may be stored in product database 110 and made accessible to processing device 105. According to an embodiment, product database 110 includes memory containing the identities of various products. Such products may include products offered for sale in a retail store associated with navigation system 200. After obtaining the information, navigation server 100 can query store map database 130 with the product identifier to determine the in-store location where the image was captured.

Figure 3:
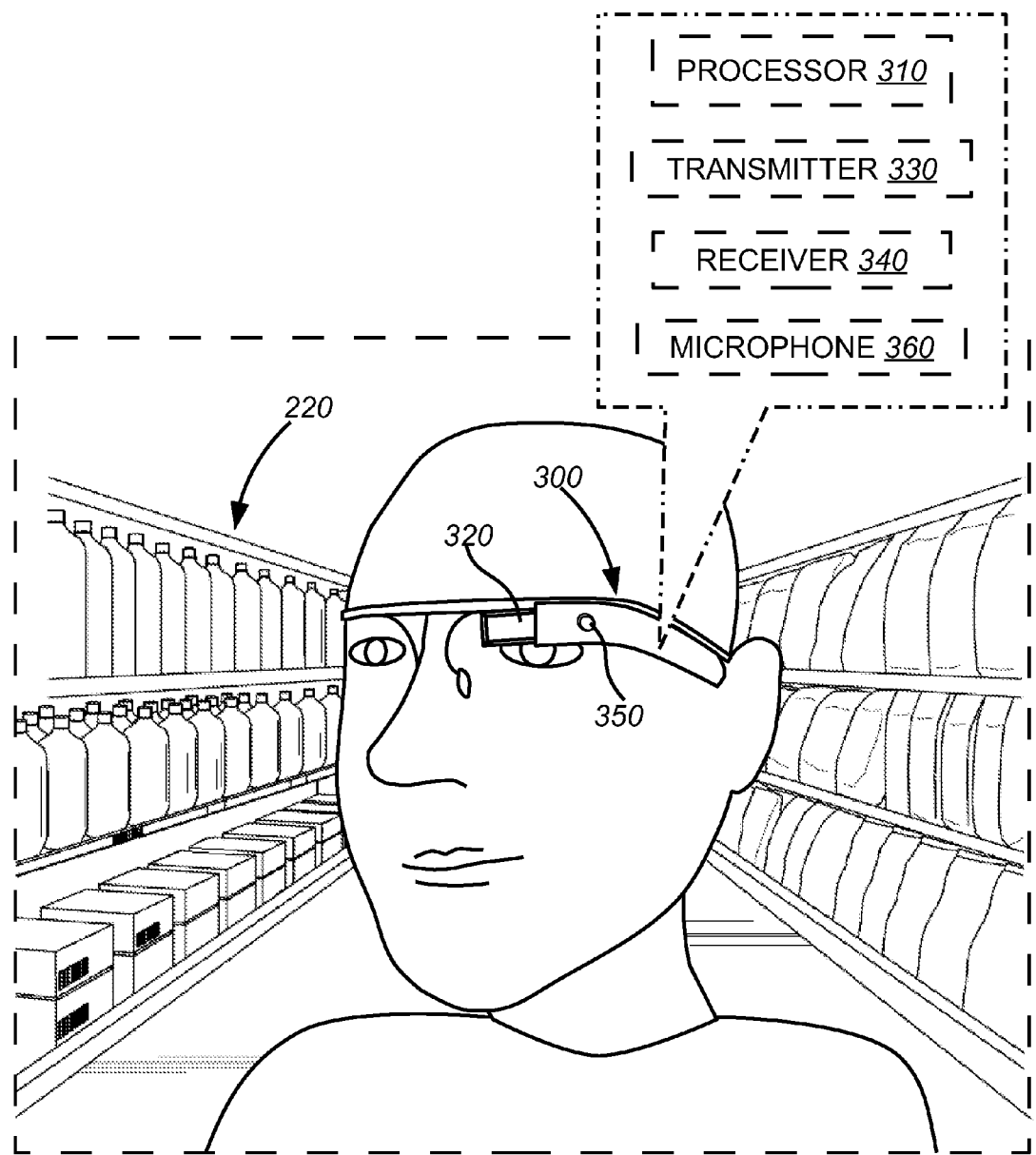
FIG. 3 is an illustration of a use of a smart glasses mobile computing device in accordance with embodiments of the present disclosure.

FIG. 3 is an example illustration of a mobile computing device 300 applied according to embodiments of the present disclosure. As depicted, one embodiment of mobile computing device 300 comprises smart glasses. In alternative embodiments, mobile computing device 300 comprises other types of mobile electronic computing devices. An embodiment of mobile computing device 300 comprises a processor 310, a display 320, a transmitter 330, a receiver 340, a camera 350, and a microphone 360. In the embodiment depicted in FIG. 3, display 320 comprises a head mounted display.

In one embodiment, processor 310 is operable to receive images captured by camera 350, as directed by the customer. Processor 310 can also be operable to control the other components 320, 330, 340, 350 of mobile computing device 300. Processor 310 can also be operable to process signals received by the mobile computing device 300. While a single processor 310 is illustrated, it should be appreciated that the term "processor" can include two or more processors that operate in an individual or distributed manner.

Display 320 may be positioned to project an image within the customer's field of view. While the customer directs camera 350 at the targeted product 220, video or still images captured by camera 350 can be shown to the consumer on display 320. Display 320 can be configured to display text, graphics, images, illustrations, user interface objects, and/or any other video signals to the customer.

In an embodiment, transmitter 330 is configured to transmit signals generated by components 310, 320, 350, or 360 of mobile computing device 300. Processor 310 can direct signals from mobile computing device 300 to navigation server 100 via transmitter 330. In an embodiment, transmitter 330 comprises an electrical communication element within processor 310. In one embodiment, processor 310 is operable to direct signals to transmitter 330 and transmitter 330 is operable to transmit the signals from mobile computing device 300 to, for example, navigation server 100 via network 230.

In an embodiment, receiver 340 is configured to receive signals and to direct signals that have been received to processor 310 for further processing and/or recording. Receiver 340 may be operable to receive transmissions via network 230 and subsequently communicate the transmissions to processor 310. In various embodiments, receiver 340 comprises an electrical communication element within processor 310. In some embodiments of the present disclosure, receiver 340 and transmitter 330 comprises an integral component.

Transmitter 330 and receiver 340 are adapted to communicate over a Wi-Fi network, allowing mobile computing device 300 to exchange data wirelessly (using radio waves or the like) over a computer network, including high-speed Internet connections. Transmitter 330 and receiver 340 may also apply Bluetooth® standards for exchanging data by using short-wavelength radio transmissions, thereby creating a personal area network (PAN). In an embodiment, transmitter 330 and receiver 340 also apply 3G and/or 4G as defined by the International Mobile Telecommunications-2000 (IMT-2000) specifications promulgated by the International Telecommunication Union.

One embodiment of mobile computing device 300 comprises one or more microphones 360. Microphone 360 is adapted to convert sounds to electrical signals and transmit said signals to processor 310 and/or a speech recognition system. One embodiment of the present disclosure comprises a speech recognition system on mobile computing device 300. Another embodiment comprises a speech recognition system at a remote server. In embodiments, microphone 360 can receive verbal commands from the customer. Said verbal commands can be interpreted and translated to user inputs.

An embodiment of mobile computing device 300 comprises one or more speakers. Each speaker can be configured to emit sounds, messages, information, and any other audio signal to the consumer. Speaker can be positioned within the consumer's range of hearing while using mobile computing device 300. Audio content transmitted from navigation server 100 can be played for the consumer through the speaker. Receiver 340 can receive an audio signal from navigation server 100 and direct the audio signal to processor 310. Processor 310 may then control the speaker to emit the audio content.

Figure 4A:
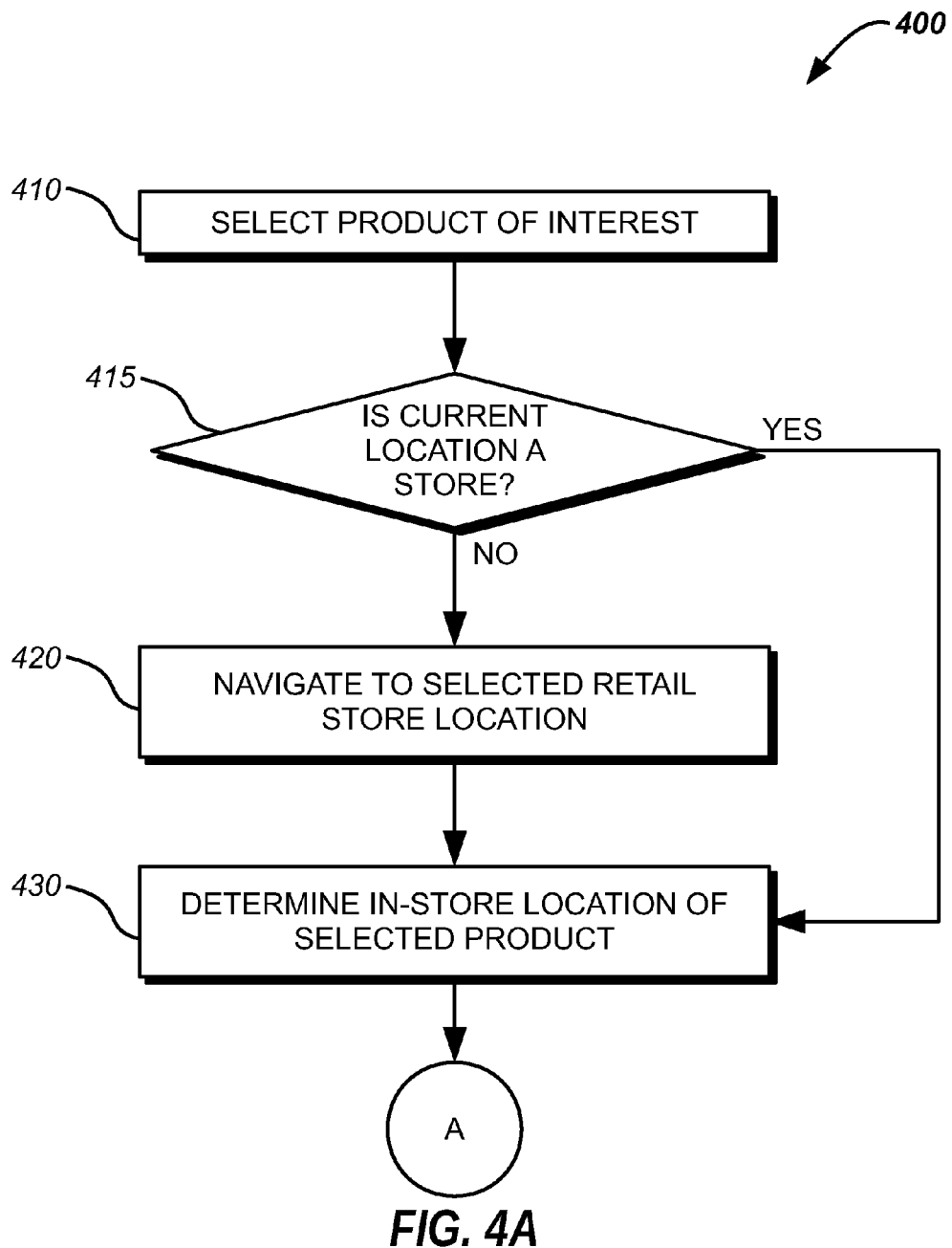
FIG. 4A is a first part of a flow chart illustration of a method of navigating to a selected product according to one embodiment of the present disclosure.

In operation, navigation system 200 may facilitate navigation from a customer's current location to a location of a selected product within a retail store. Embodiments of the present disclosure can determine the current location within a retail store by identifying products on store shelves with a camera of a mobile computing device and then by utilizing computer image recognition techniques. According to one embodiment, the known shelf location of identified products can be presumed to be the in-store current location of the customer. Referring now to FIGS. 4A and 4B, a method 400 for providing navigation is depicted.

Method 400 begins at operation 410, where the customer selects one or more products of interest and requests navigation to the product in a particular store. In one embodiment, the customer selects the product of interest by making an input on an object in a graphical user interface displayed on the mobile computing device. In one embodiment, the customer conducts a text search for the product on an app, web interface, or the like. In other embodiments, the customer selects the product of interest by other means already known in the art or not yet known in the art.

In an embodiment of operation 410, the customer requests to receive navigation to the selected product at a selected retail store location. In one embodiment, the selected retail store is the closet retail store to the customer's current location. Thus, if the customer is already at or in a retail store location, that store location may be selected. In another embodiment, the customer has a preferred retail store location, which may be selected. In an embodiment, if the selected product is not in stock at the closest and/or preferred store location, but the selected product is available at other nearby store locations, a retail store location may be selected based, in part, on the availability of the selected product. In one embodiment, the selected product is a product that the customer wishes to purchase.

At operation 415, the customer's current location is determined or approximated. If the mobile computing device can receive GPS signals, cellular network signals, or other signals operational to ascertain the current location, the mobile computing device may do so to determine the current location. If the current location is determined to be at a retail store location, the mobile computing device may transition into an "in-store" mode and skip to operation 430. In one embodiment, if the mobile computing device can receive a wireless network signal known to be produced at the retail location, for example a Wi-Fi network provided by the retailer, it may be presumed that the customer's current location is at the retail store location.

At operation 420, navigation is provided to the selected retail store location using GPS, cellular network signals, combinations thereof, and other methods of providing location information to a mobile computing device. Maps of streets, public transportation, walking paths, and other possible routes may be downloaded from the Internet via Network 230 or may be stored on the mobile computing device. Such maps may be utilized to provide directions to the customer, on a turn-by-turn basis or otherwise, to travel to the selected retail store.

In one embodiment, upon arriving at the selected retail store location, the customer may be instructed to enter the premises and advance to the aisle where the selected product may be found. Upon entering the store, the mobile computing device may transition into an "in-store" mode and navigation may then be provided to the location of the selected product within the store.

At operation 430, the in-store location of the selected product is determined. In an embodiment, the location of the selected product may be determined by querying store map database 130 for the location of the particular selected product. The in-store location may comprise an aisle number, a bay number, a display number, a shelf number, combinations of the foregoing, or other indicia of in-store locations. In one embodiment, the in-store location comprises coordinates.

At operation 440, the mobile computing device 300 may capture images within the store via camera 350 as the customer walks. In embodiments where the mobile computing device comprises smart glasses 300, camera 350 may capture essentially all images as seen by the customer while the mobile computing device 300 is in navigation and in-store modes. In other words, as the customer faces one or more products 220 on the shelves while wearing the smart glasses 300, the camera 350 may capture images of the products 220.

In other embodiments, the customer may manually aim the camera 350 of a mobile computing device at various products 220 on the shelves. Images captured by camera 350 may include various products 220. Such products may be referred to herein as "targeted products."

According to an embodiment, while the mobile computing device remains in the in-store mode, it can repeatedly receive and analyze images captured by the camera to determine the identity of targeted products. In one embodiment, the captured images are transmitted to the processor of the mobile computing device for analysis and product recognition. In other embodiments, the captured images are transmitted to navigation server 100. In alternative embodiments, preliminary processing on captured images is carried out by the processor of the mobile computing device, after which selected one or more images and the results of said preliminary processing are transmitted to navigation server 100 for product recognition.

In one embodiment of operation 440, the mobile computing device is set to in-store mode. According to this embodiment, while the device remains in in-store mode, multiple image frames are captured. In one embodiment, the mobile computing device may remain in in-store mode and therefore continually capture images until the selected product has been reached. In one embodiment, each captured frame is analyzed. In another embodiment, selected frames are analyzed.

According to an embodiment, at operation 440, preliminary processing that is carried out by the processor of the mobile computing device comprises detection of features in each of the one or more selected captured images. In one embodiment, a feature detection algorithm known as SURF (Speeded-Up Robust Features) is carried out by the processor of the mobile computing device to detect features in the one or more images. In other embodiments, other feature detection algorithms are carried out to detect features in the one or more images using a feature detection algorithm that is known in the art or yet to be known. In an embodiment, feature detection operations are performed on multiple images captured sequentially from the camera on the mobile computing device.

Upon completing the preliminary analysis, a selection of one or more images exhibiting a threshold number of detected features may be made from the multiple captured images to transmit to navigation server 100 for further analysis and product matching. In another embodiment, additional analysis is carried out to make a selection of one or more images to transmit to navigation server 100.

At operation 450, one or more selected images of targeted products are transferred to navigation server 100. As described herein, the transmission may take place over any one of a variety of network types or combinations thereof.

At operation 460, the transmitted images are received at navigation server 100 and compared to images at product image store 120 for matches. According to embodiments of the present disclosure, navigation server 100 is adapted to compensate for image rotation and scaling differences between captured images and images at product image store 120. In one embodiment of operation 460, a match score is determined between an image captured by the camera and an image at product image store 120. After carrying out image comparison operations between the received image and the images at product image store 120, the highest match score may determine the closest match.

In one embodiment, a minimum score threshold is instituted so that if no match score exceeds the threshold, it may be presumed that the customer image does not depict a product that the retailer offers. In one embodiment, machine learning techniques are carried out with respect to the minimum score threshold by inputting multiple known matching image pairs and thus building a model to determine if image pairs are similar enough to constitute a match.

In one embodiment of operation 460, navigation server 100 is adapted to identify multiple targeted products for each image captured by the mobile computing device. Each image may be split into multiple constituent images, with each constituent image depicting a targeted product captured by the camera.

It is an objective of some embodiments of the present disclosure to prevent false positive identifications of products that are presumably at their proper location on the store shelves, but have actually been moved. For example, if a customer directs camera 350 at a shopping cart that contains one or more products, images of those products may be transmitted to navigation server 100 for matching. Assuming that the cart has been moved a significant distance from the original shelf location of the products, a positive match between the products in the cart and images at product image store 120 may lead to an incorrect conclusion regarding the current location since the targeted product was not actually at its proper location on the shelf. Thus, it may be preferable to ignore products that are in a shopping cart or otherwise not on the shelves. Accordingly, embodiments of the present disclosure may employee several qualification techniques to ensure the integrity of navigation system 100 and prevent false identification of products not on the store shelves.

In one embodiment of the present disclosure, a qualification technique incorporates the assumption that if multiples of the same product are in an image, then those products are together on a shelf. This technique operates on the assumption that shoppers are less likely to purchase multiples of the same product at the same time and it further operates on the fact that the same products are found next to each other on the store shelf. Thus, if a captured image has been split into multiple constituent images, each of which depicts the same product, it may be presumed that those products are on the shelf and the known shelf location, as stored at store map database 130, may be used as the current location.

Likewise, in one embodiment of the present disclosure, if a captured image depicts multiple products, each one comprising products in a shared category (for example interchangeable products from different brands), which have a low probability of being purchased together but may be found next to each other on the store shelf, it may be presumed that those products are at their proper shelf location.

Conversely, in one embodiment of the present disclosure, if a captured image depicts multiple different products in close proximity to each other, it may be presumed that those products are not at their proper shelf location and may be disregarded.

In another embodiment of the present disclosure, the customer may be requested by the mobile computing device to direct camera 350 at a store shelf so that an image of the targeted products placed there may be captured and transmitted to navigation server 100 for comparison.

As would be understood by a person of ordinary skill in the art having the benefit of the present disclosure, images captured by cameras on a mobile computing device may comprise relatively low resolution in comparison to images generated by a dedicated camera. Thus, lower thresholds may be instituted in the matching algorithm in order to compensate for anticipated low resolution images received from customers.

In one embodiment of operation 460, recognition and analysis of text, product codes (such as UPC/bar codes), and other information on targeted products or packaging may be used to assist product matching. For example, the name of a product may appear as text on the product packaging. An image of the packaging may depict the product name. By recognizing and extracting such text from the image, the result of the matching operation 460 may be validated.

In one embodiment, a result of operation 460 is that a product has been matched to an image captured by the camera. In some embodiments, multiple products are identified from the received images. If so desired, navigation server 100 may be enabled to identify any number of products depicted. In some embodiments, multiple products are potentially selected from each image frame captured by the customer's camera.

In one embodiment, navigation server 100 may receive multiple images or image frames (i.e., from a video feed), each image or image frame depicting a product. In one embodiment, navigation server 100 may be configured to only confirm a product selection after identifying the product in a minimum quantity of consecutive images or frames, as captured by the customer's mobile computing device. In this manner, navigation server 100 may minimize false positive identifications of products.

At operation 470, navigation server 100 queries product image store 120 for location information related to the one or more identified targeted products. In one embodiment, such information may include an aisle number, a bay number, a display number, a shelf number, location coordinates, combinations of the foregoing, or other indicia of in-store locations. According to embodiments, the location of identified targeted products may be presumed to be the current location.

At operation 480, the mobile computing device calculates a route and provides directions for the customer to navigate from the current location to the in-store location of the selected product. According to embodiments, the route may be optimized for shortest path, least obstacles, easiest maneuvering with a shopping cart, or other selected considerations. In one embodiment, a navigation user interface is displayed to the customer, depicting a map of the store and the calculated route.

In one embodiment of the present disclosure, a form of dead reckoning may be additionally employed to determine the customer's current location. In particular, navigation system 200 may continually track the customer's movement beginning upon entrance into the store. In embodiments, certain assumptions may be utilized, such as a maximum walking velocity, to validate a current location determination. Additionally, embodiments of the mobile computing device comprise a compass, accelerometers, and other sensors that may register movement and/or orientation of the mobile computing device. Data generated by such sensors may also be used to validate a current location determination.

At operation 485, as the customer walks along the route, but before arriving at the selected product destination, the customer's location is checked to determine if the customer has arrived at the selected product destination. If not, operations 440, 450, 460, 470, 480, and 485 may be repeated in a cycle to update the current location and display a map of the route reflecting the updated current location. Upon arrival at the selected product destination, method 400 completes at operation 490.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for navigating to a selected product, comprising:
    receiving, at a processing device of a navigation server, one or more signals from a mobile computing device corresponding to one or more images of a targeted product;
    receiving at least one image from a product image store;
    determining, at the processing device, that the one or more images of the targeted product matches the at least one image stored at the product image store by:
        comparing, at the processing device, the one or more images of the targeted product to the at least one image stored at the product image store, thereby resulting in a comparison score; and
        determining, at the processing device, that the comparison score meets a minimum score threshold;
    in response to the comparison score meeting the minimum score threshold, recalling, from a store map database, information regarding an in-store location of the targeted product;
    mapping a current location based on the in-store location of the targeted product; and
    transmitting, from the processing device, directions and actively navigating from the current location to the in-store location of the targeted product.

2. The method of claim 1, wherein the information regarding the in-store location of the targeted product is selected from the group consisting of: an aisle number, a bay number, a display number, a shelf number, a location coordinate, and combinations thereof.

3. The method of claim 1, further comprising initially defining the current location as an out-of-store location.

4. The method of claim 1, wherein determining, at the processing device, if the one or more images of the targeted product matches at least one image stored at the product image store further comprises applying a feature detection algorithm to the one or more images of the targeted product.

5. The method of claim 4, wherein applying the feature detection algorithm to the one or more images of the targeted product comprises carrying out a Speeded-Up Robust Features (SURF) feature detection algorithm.

6. The method of claim 1, wherein determining, at the processing device, if the one or more images of the targeted product matches at least one image stored at the product image store further comprises:
    splitting the one or more images of the targeted product into multiple constituent images and comparing each of the multiple constituent images to the at least one image stored at the product image store.

7. The method of claim 1, further comprising calculating a route from the current location to the in-store location of the targeted product.

8. A computer-implemented system for navigating to a selected product comprising:
    a navigation server comprising a memory device and a processing device, the memory device storing computer-readable instructions directing the processing device to:
        receive one or more signals from a mobile computing device corresponding to one or more images of a targeted product;
        receive at least one image from a product image store;
        determine that the one or more images of the targeted product matches the at least one image stored at the product image store by:
            comparing the one or more images of the targeted product to the at least one image stored at the product image store, thereby resulting in a comparison score; and
            determining that the comparison score meets a minimum score threshold;
        in response to the comparison score meeting the minimum score threshold, obtain, from a store map database, information regarding an in-store location of the targeted product;
        map a current location based on the in-store location of the targeted product; and
        transmit directions and actively navigate from the current location to the in-store location of the targeted product.

9. The system of claim 8, wherein the information regarding the in-store location of the targeted product is selected from the group consisting of: an aisle number, a bay number, a display number, a shelf number, a location coordinate, and combinations thereof.

10. The system of claim 8, wherein the computer-readable instructions further direct the processing device to initially define the current location as an out-of-store location.

11. The system of claim 8, wherein the computer-readable instructions further direct the processing device to apply a feature detection algorithm to the one or more images of the targeted product.

12. The system of claim 11 wherein the computer-readable instructions further direct the processing device to carry out a Speeded-Up Robust Features (SURF) feature detection algorithm.

13. The system of claim 8, wherein the computer-readable instructions further direct the processing device to:
    split the one or more images of the targeted product into multiple constituent images and
    compare each of the multiple constituent images to the at least one image stored at the product image store.

14. The system of claim 8, wherein the computer-readable instructions further direct the processing device to calculate a route from the current location to the in-store location of the targeted product.

15. A system, comprising:
    a plurality of computer-readable instructions in the form of an application executable by a processor of a mobile computing device to:
        generate one or more signals corresponding to one or more images of a targeted product; and a navigation server comprising a memory device and a processing device, the memory device storing computer-readable instructions directing the processing device to:
  receive the one or more signals corresponding to the one or more images of the targeted product from the application of the mobile computing device;
  receive at least one image from a product image store;
  determine that the one or more images of the targeted product matches the at least one image stored at the product image store by:
    comparing the one or more images of the targeted product to the at least one image stored at the product image store, thereby resulting m a comparison score; and
    determining that the comparison score meets a minimum score threshold,
  in response to the comparison score meeting the minimum score threshold, obtain, from the store map database, information regarding an in-store location of the targeted product;
  map a current location based on the in-store location of the targeted product; and
  transmit directions to the application of the mobile device and actively navigate from the current location to the in-store location of the targeted product.

16. The system of claim 15, wherein the information regarding the in-store location of the targeted product is selected from the group consisting of: an aisle number, a bay number, a display number, a shelf number, a location coordinate, and combinations thereof.

17. The system of claim 15, wherein the computer-readable instructions further direct the processing device to initially define the current location as an out-of-store location.

18. The system of claim 15, wherein the computer-readable instructions further direct the processing device to apply a feature detection algorithm to the one or more images of the targeted product.

19. The system of claim 18, wherein the computer-readable instructions further direct the processing device to carry out a Speeded-Up Robust Features (SURF) feature detection algorithm.

20. The system of claim 15, wherein the computer-readable instructions further direct the processing device to:
  split the one or more images of the targeted product into multiple constituent images and
  compare each of the multiple constituent images to the at least one image stored at the product image store.

* * * * *